Aug. 16, 1966 L. W. BLEIMAN 3,266,497

DATA PROCESSING

Filed Sept. 10, 1963 4 Sheets-Sheet 1

INVENTOR.
LEWIS W. BLEIMAN

BY [signature]

Attorney

Aug. 16, 1966

L. W. BLEIMAN 3,266,497

DATA PROCESSING

Filed Sept. 10, 1963

4 Sheets-Sheet 2

INVENTOR.
LEWIS W. BLEIMAN
BY Samuel Cohen
Attorney

INVENTOR.
LEWIS W. BLEIMAN
BY Samuel Cohen
Attorney

DATA PROCESSING

Filed Sept. 10, 1963 4 Sheets-Sheet 4

INVENTOR.
LEWIS W. BLEIMAN
BY Samuel Cohen
Attorney

United States Patent Office 3,266,497
Patented August 16, 1966

3,266,497
DATA PROCESSING

Lewis W. Bleiman, Northridge, Calif., assignor to Radio Corporation of America, a corporation of Delaware Filed Sept. 10, 1963, Ser. No. 308,012
10 Claims. (Cl. 129—16.1)

This invention relates to an improved system for selecting from a pack of randomly arranged data storage cards, a desired card.

Many systems have been proposed for selecting one card out of a pack of such cards randomly arranged in a card magazine. In one such system, the cards are formed with code notches along an edge thereof and bars arranged in a code corresponding to that of a desired card are made to abut these coded edges. These bars hold all except a desired card in place in the magazine. The magazine is thereafter vibrated or struck sharply to cause the desired card to be dislodged from the remainder of the pack and to partially extend from the pack. Alternatively, the cards may include magnetic elements at one or more edges of the card and in this case the desired card may be partially withdrawn by applying a magnetic field to all of the cards.

It is found in practicing the methods of card withdrawal described above, that the length of time required for the card partially to drop away from the remainder of the pack, or, in the case of magnetic withdrawal, to be pulled partially out of the remainder of the pack, is variable. In some cases, as a matter of fact, the selected card or cards "hang up"—do not drop at all. One reason for the variable withdrawal time is card-to-card adhesion due to static electricity, moisture, friction, or leaning of one portion of the pack against the card it is desired to select. Regardless of the reason, the failure of the card to be available at a known time is undesirable because it lessens the system operative speed, increases the complexity of the associated electrical logic circuits, and introduces the possibilities of errors.

An object of the present invention is to provide a positive system for selecting a card from a pack of cards, which system is capable of operating at relatively high speeds and in which the time required for the withdrawal of any card, regardless of its position in the pack, its condition, or any other parameter, is substantially the same.

In the system of the invention, the cards employed are coded on two opposite edges. Bars located adjacent to one of the edges cause a group of cards in the pack to be pushed away from the remainder of the pack. Restrainer bars located at the opposite edges of the cards allow only the desired cards to be moved and hold the remaining cards in place. A gripper bar means engages and holds one card of the group of cards moved out of the pack and a push-down bar means returns the remaining cards of the group of cards back to the pack. Thereafter, the gripper bar means withdraws the card it engages and starts the card traveling toward another location such as a read-write station.

Figure 1A:
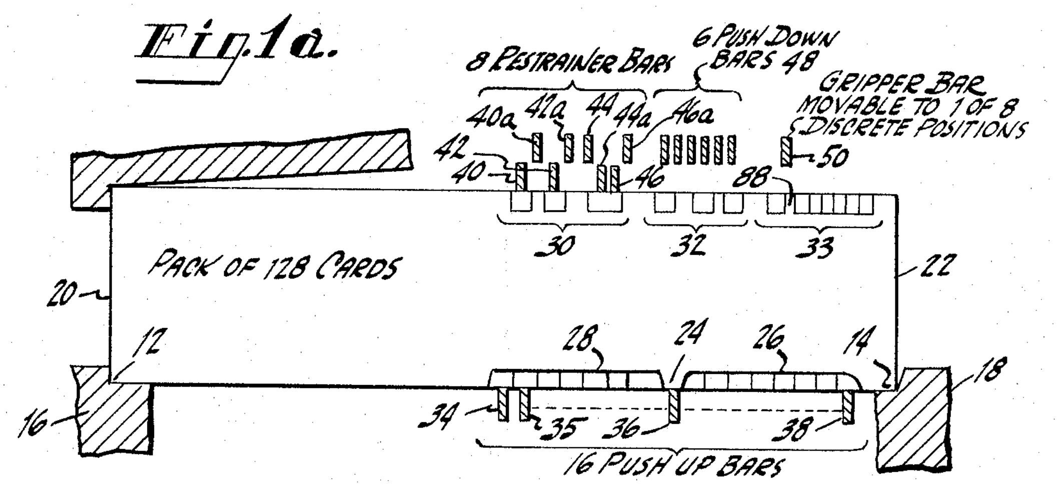
Figures 1B, 1C:
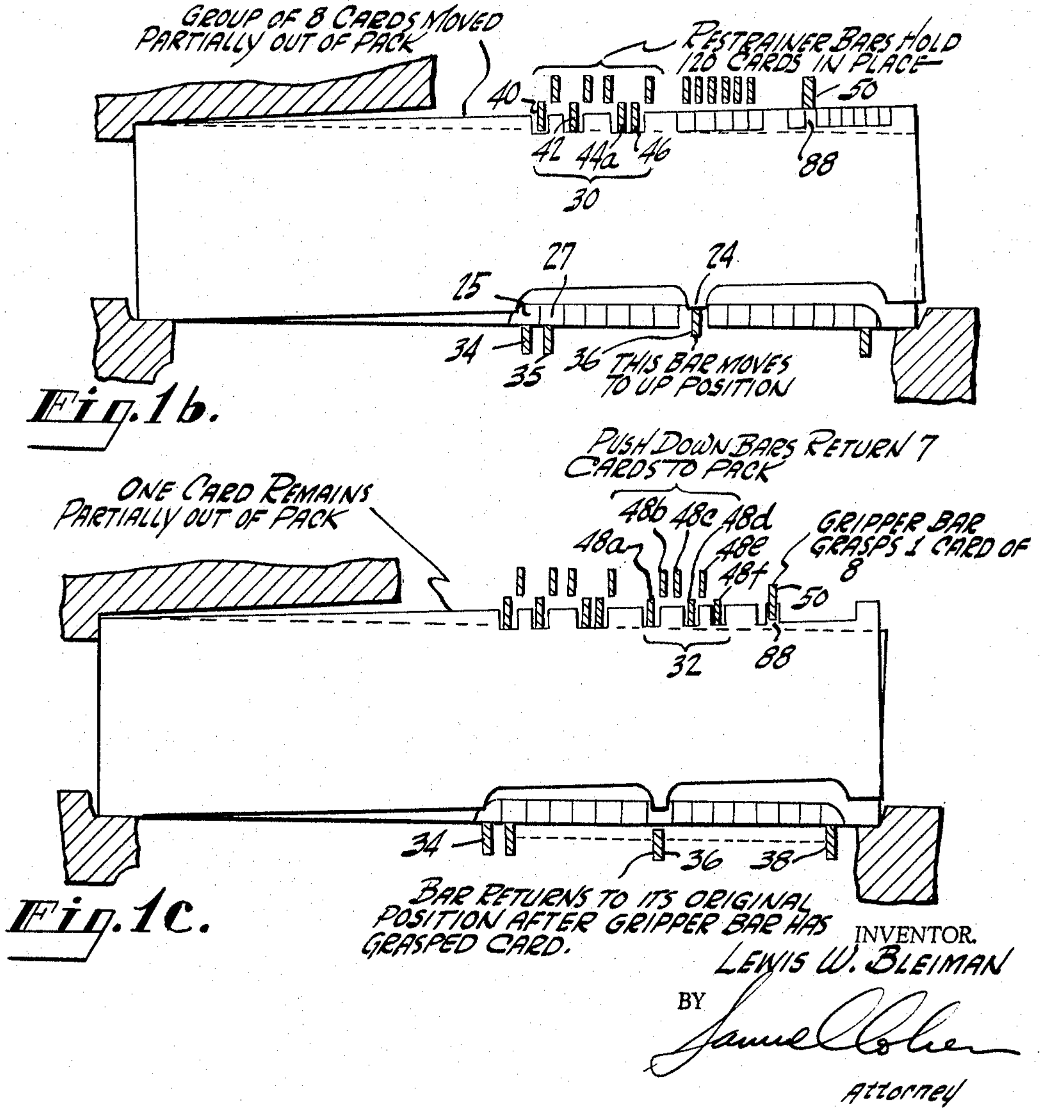
Figure 1D:
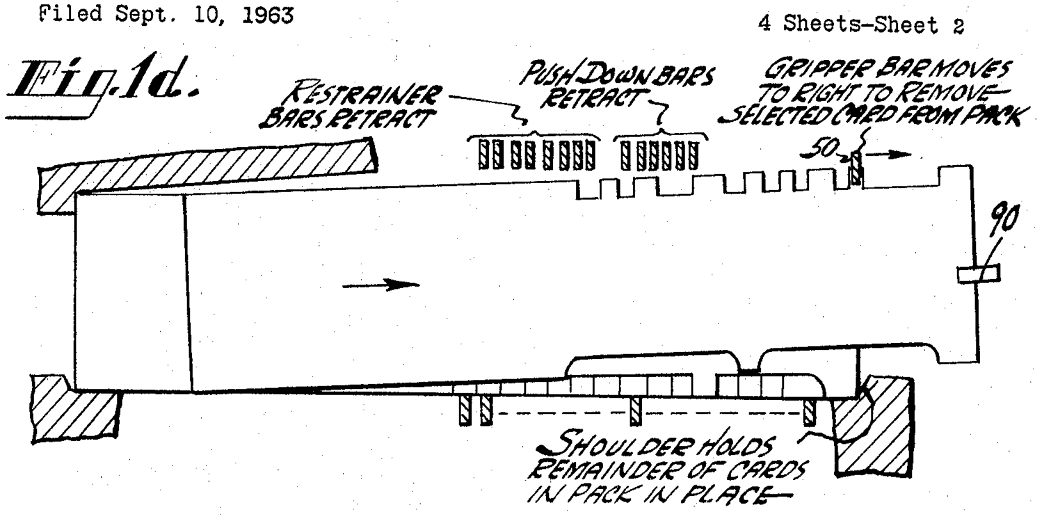
Figure 2:
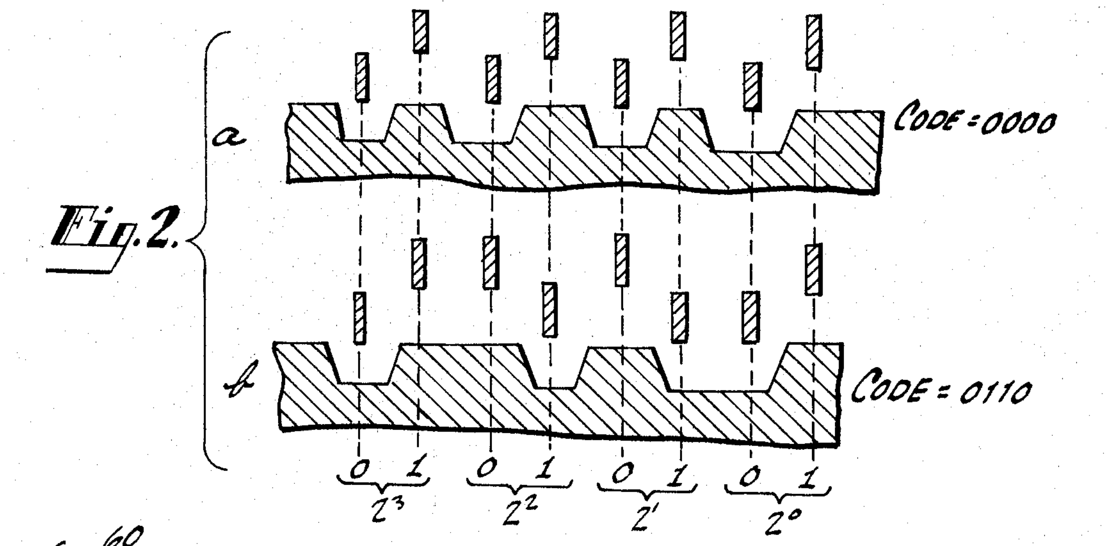
Figure 3A:
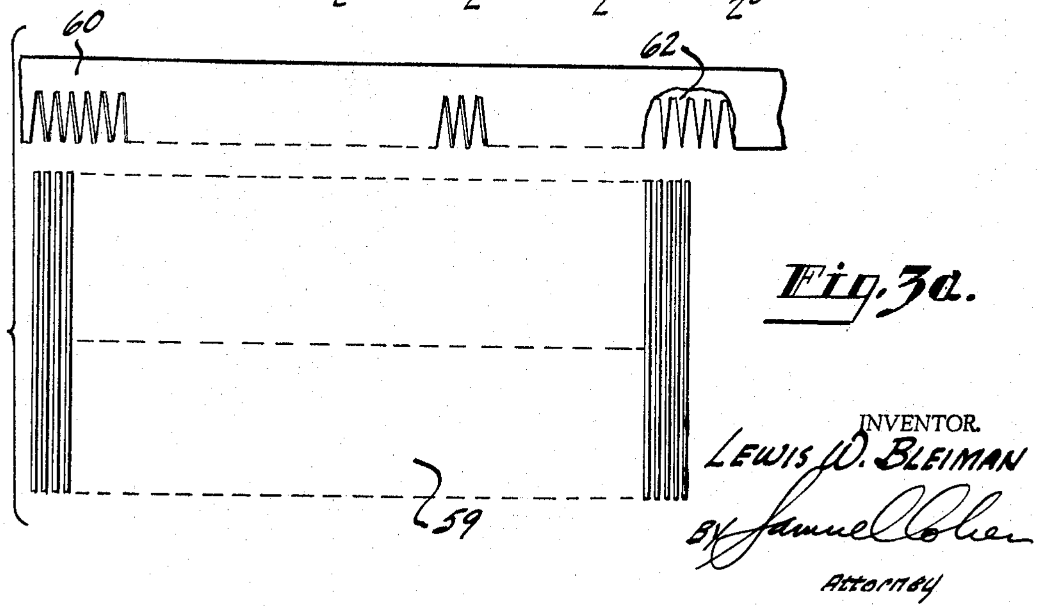
Figure 3B:
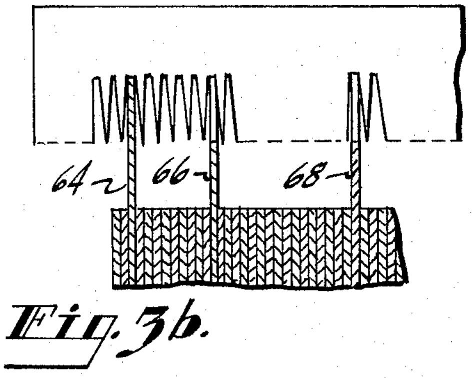
Figure 3C:
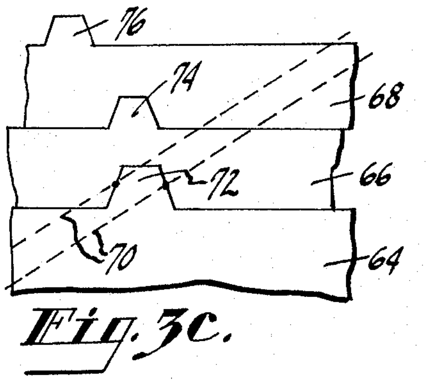
Figure 5A:
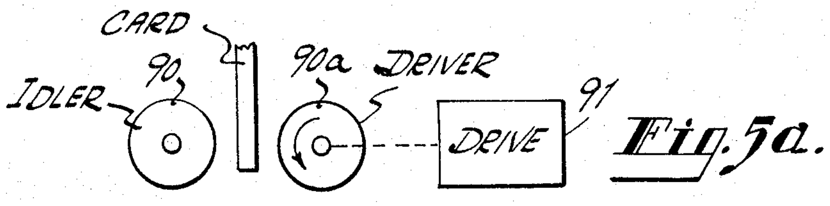
Figures 4, 5B:
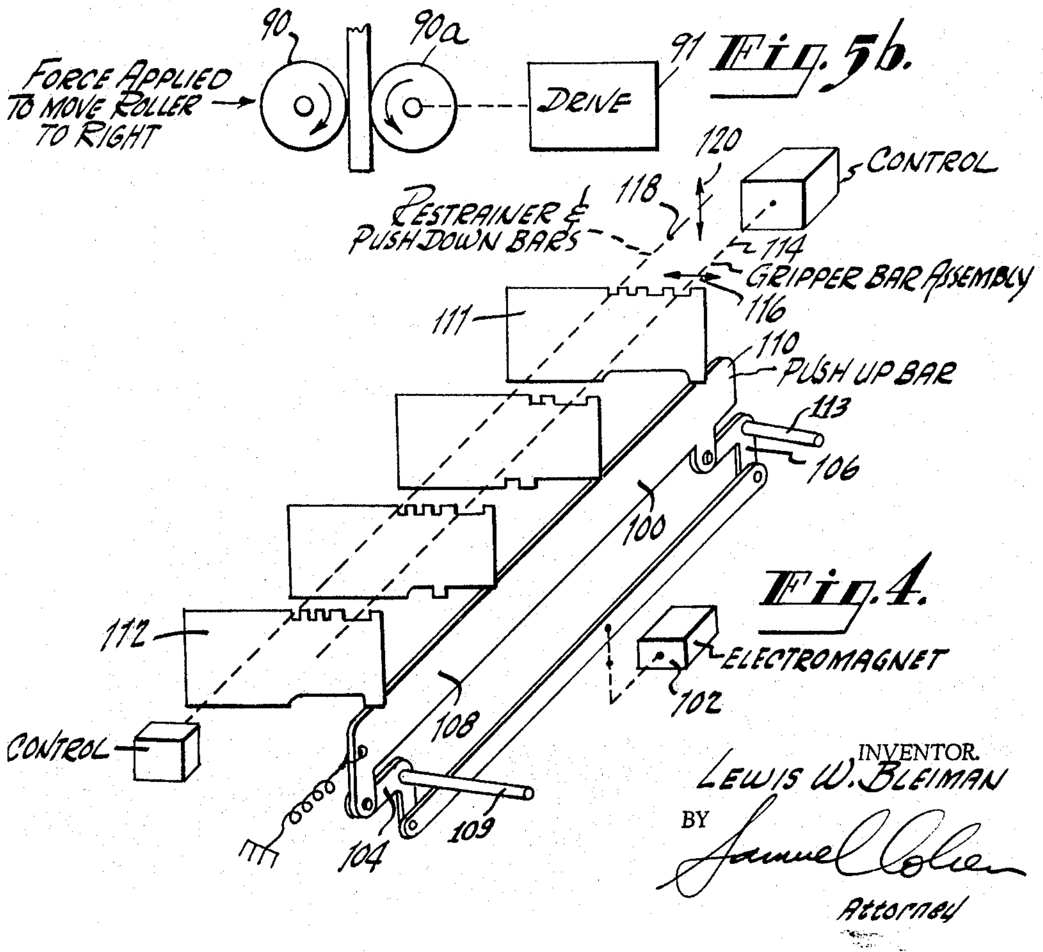
Figure 6:
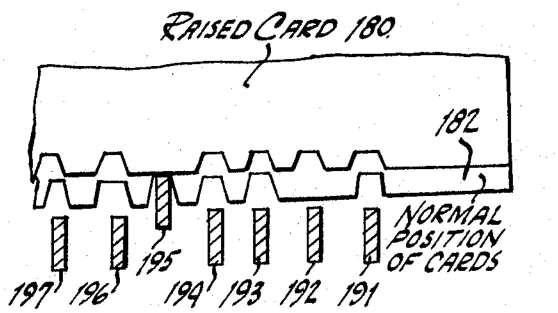

The invention is discussed in greater detail below and is illustrated in the following drawings of which:

FIGS. 1*a* to 1*d* are schematic showings of an embodiment of the invention illustrating how a desired card is withdrawn from a pack of such cards;

FIG. 2 is a schematic showing of how the restrainer bars of FIG. 1 are coded;

FIG. 3*a* is a more detailed view of the gripper bars of FIG. 1;

FIG. 3*b* shows the gripper bar engaging the selected card;

FIG. 3*c* is an enlarged view of the positions of a number of the cards extending from the remainder of the pack;

FIG. 4 is a perspective sketch further illustrating the card selection system of the invention;

FIGS. 5*a* and *b* are sketches illustrating the operation of the drive rollers of FIG. 1*d*;

FIG. 6 shows a preferred push-up bar card coding arrangement; and

Figure 7A:
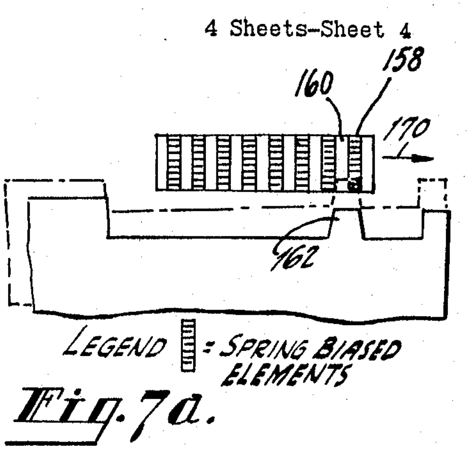
Figure 7B:
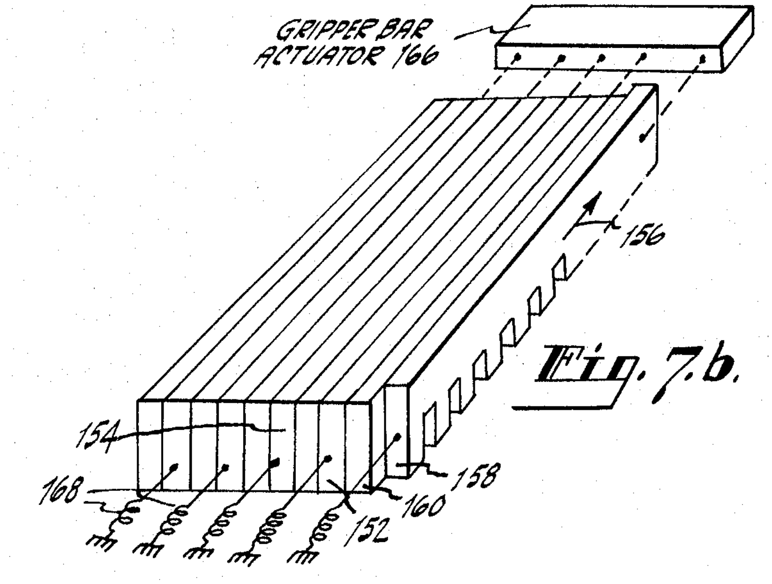
Figure 7C:
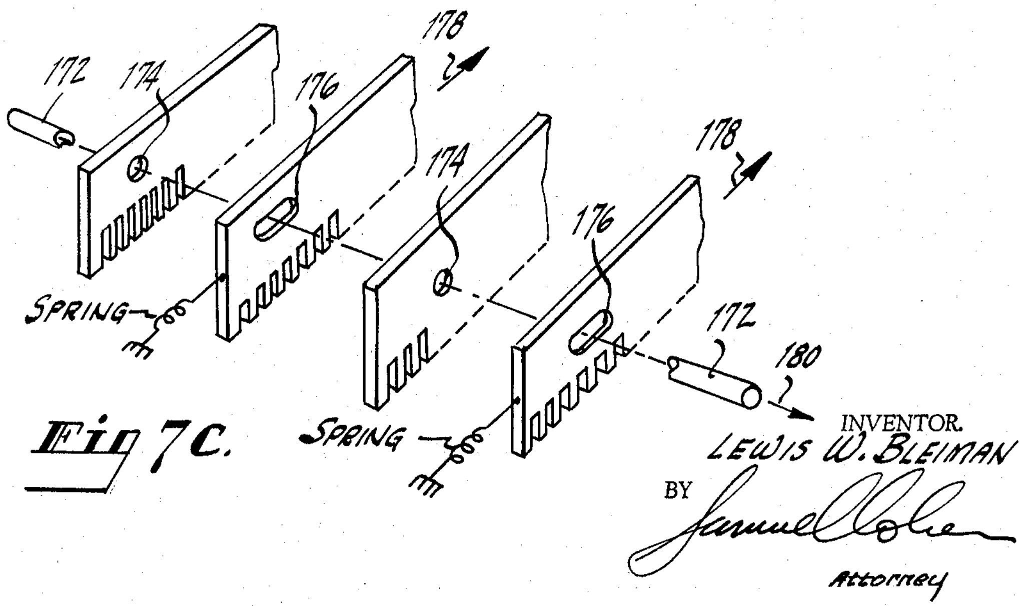

FIGS. 7*a* to 7*c* illustrate an alternative gripper bar assembly suitable for use in the present card selection system.

A plan view of a pack of cards appears in FIG. 1*a*. For purposes of the present discussion, it is assumed that there are 128 cards in the pack. In one particular system, the cards are formed of Mylar and are coated with magnetic material. Each card is roughly 16" x 4½". Binary information is written on the cards by means of magnetic write heads, along parallel tracks extending in a direction parallel to the long dimension of the card. However, it is to be understood that the invention is equally applicable to punched cards or any other type of information storage cards.

The cards are supported at their opposite corners 12 and 14 by a chassis, actually the bottom portions of a magazine, illustrated schematically at 16 and 18, respectively. In practice, the magazine is open at its two shorter faces corresponding to the narrow edges 20 and 22 of the card and may be similar in this respect to the card magazine described in application Serial No. 224,420, filed September 18, 1962, by E. H. Irasek, and assigned to the same assignee as the preesnt invention. The cards are propelled out of the pack through the open face of the magazine next to the edge 22 and returned to the pack through the open face next to the edge 20 as in the magazine of the copending application. The magazine also has openings at the bottom and top (in this last respect it differs from the magazine of the copending application) to permit the bars which are discussed shortly to abut or engage the cards, as required.

The cards are formed with notches at their lower edge. For example, the first card, that is, the card which is entirely visible in FIG. 1*a*, is formed with a single projection or tab 24 located between two long cut-outs or notches 26 and 28. The cards are also formed with code notches 30 and 32 and with graspable elements 33, at their upper edge. As is explained shortly, the notches 26 and 28 at the lower edge and the notches 30 are for the purpose of permitting the selection of a group of cards out of the pack. In the example chosen for illustration, 8 cards are pushed out of the pack of 128. The edge coding at 32 permits the push-down bars to return selectively to the pack seven of the eight cards pushed out. The tabs 33 permit the one card it is desired to select to be engaged selectively by a grasping means, the gripper bar 50.

There are 16 push-up bars, four of which 34, 35, 36 and 38 are shown, located next to the coded lower edge of the cards. There are eight restrainer bars (four pairs) 40, **40*a*, 42, 42*a*, 44, 44*a*, 46 and 46*a* located next to the notches 30 and six push-down bars 48 located next to the notches 32. A gripper bar 50, which is movable to one of eight discrete positions, is located next to the tabs 33**.

In the operation of the system, first the restrainer bars 40, **40*a*, 42, 42*a*, 44, 44*a*, 46, 46*a*** are positoned to represent a desired binary code. The convention adopted here is that the left hand bar of each pair of restrainer bars is down and the right-hand bar up for a binary zero, and the left-hand bar up and the right-hand bar down for a binary one. In FIGS. 1*a*–1*c* the code represented is 0010. (An enlarged view of the restrainer bars positioned to represent other codes with correspondingly coded cards next to the bars appears in FIG. 2). After the restrainer bars are in place, a particular one (bar 36, in the present case) of the 16 pusher bars is moved in an upward direction. When any one of the 16 push-up bars is moved up, the remaining 15 bars remain in their original position.

The bar 36, when moved to the up position moves eight of the 128 cards partially out of the pack as indicated in FIG. 1*b*. The restrainer bars 40, 42, 44*a*, 46 hold the remaining 120 cards in place. This is because only eight of the cards, the face card being one of them, are notched in the area 30 to represent the code 0010, which corresponds to the particular restrainer bar code 0010, shown. These same eight cards are the only ones of the 128 with a tab in position 24 along the lower edge of the card. The remaining 120 cards have a cutout in position 24 and so are not engaged by bar 36. These 120 cards also are formed with at least one tab which abuts one of the restrainer bars 40, 42, 44*a*, 46 so that the restrainer bars hold them in place. These remaining 120 cards are coded in the area 30 and along the bottom edges of the cards in different groups of eight cards each. For example, eight other cards have tabs at 25 which are engageable by push-up bar 34, and these eight other cards may be coded in the area 30 to represent a code such as 0000. Eight other cards may have tabs at 27 engageable by push-up bar 35, and may be coded in the area 30 to represent 0001, and so on. Any card may be located anywhere in the pack and is randomly accessible.

Referring next to FIG. 1*c*, the gripper bar 50 moves to a position over the tab 88 of the one card it is desired to select from the group of eight cards which are partially out of the pack. The remaining seven cards each have a tab in the area 33 in a different position than tab 88. The gripper bar then moves down on the tab 88 and grasps the tab, in a manner more fully explained hereinafter. The tabs on the remaining seven cards do not align with the gripper bar and are not grasped. Thereafter, the pusher bar 36 returns to its original position as shown in FIG. 1*c*. Then, the push-down bars 48 (using the same convention if desired, as for the restrainer bars, i.e. by arranging these bars in pairs up or down) are arranged to represent a binary code such that the seven cards not gripped by the gripper bar are returned to the pack. In the illustration, the binary code is 011 and this corresponds to the notches 32 in the face card. The remaining seven cards have notches 30 so cut that each card is engaged by at least one of the bars 48*a*, 48*d* and 48*f* (these are the three bars which moved to the down position) and each is pushed back into the pack. Therefore, only the face card remains in the upward position partially out of the pack.

The next step in the selection process is illustrated in FIG. 1*d*. The restrainer bars and the push-down bars are all raised to their retracted position. The gripper bar 50 propels the selected card to the right until the card is in position between the rollers 90 and 90*a*. A top view of these rollers appears in FIGS. 5*a* and 5*b*. Roller 90*a* may be continuously driven by drive means 91, which may be a motor or the like and roller 90 may be an idler roller.

When the gripper bar reaches a position such that the card is between the rollers 90 and 90*a*, it automatically releases the card. In response to the release of the card, the idler roller is moved to the right as shown in FIG. 5*b* and presses the card against the drive roller 90*a*. The tie in between the idler movement and the release of the card may be mechanical or electrical. In the latter case, the release of the card may be sensed and, in response thereto, an electrical signal produced which is applied to idler movement mechanism. Alternatively, a photocell arrangement which senses the card position may be employed to actuate the idler roller.

When the two rollers engage the card, it is propelled through a raceway (not shown) which guides the card to a read-write station (also not shown). After information is read from or written onto the card, it is returned to the pack through the open face of the magazine (not shown) at the left of the pack. Since these features are not a part of the present invention, they need not be discussed in detail.

There are many ways which are known for moving the various bars of the present invention to the positions required. In one system, the gripper bar is moved to any one of eight discrete positions by means of an eight position hydraulic actuator. An eight position solenoid mechanism of the type shown in FIG. 21 of the copending application may be employed instead. The means for moving the gripper bar to cause it to eject the card from the pack may be a mechanical linkage similar to the one of FIG. 7*c* of the copending application, and so on.

A more detailed showing of the gripper bar of FIG. 1 appears in FIG. 3*a*. The bar is shown over a pack of cards 59. It includes a fixed element 60 formed with "teeth" along one edge and a movable element 62 located in a channel within the fixed element. The movable element is also formed with "teeth" which correspond in size and shape to the teeth in the fixed element. The teeth are formed with flat edges rather than cutting edges and are not meant for cutting. However, in other respects, the movable element moves with respect to the fixed element in a manner analogous to the movement of the movable element of a sickle bar grass cutter.

In the operation of the gripper bar, it is first brought into position over a group of cards extending from the pack and then brought down over the cards and actuated as is shown in FIG. 3*b*. In this figure, three cards are shown extending from the remainder of the pack. Of these three cards, card 64 has a tab which is engaged by the teeth whereas cards 66 and 68 do not have tabs engaged by the teeth, although they do have tabs in other positions. This is shown more clearly in the sketch of FIG. 3*c*. The two dashed lines 70 represent the position of the gripper bar. The card 64 has a tab 72 engaged by the gripper bar. However, the tabs 74 and 76 on the cards 66 and 68 are displaced laterally from the gripper bar so that the gripper bar does not engage these tabs.

In the form of invention discussed above, there is a single gripper bar which is movable to one of eight discrete positions. It is also possible to employ eight separate gripper bars, each in a different position. One form of such an arrangement is shown in FIGS. 7*a*–7*c*. Referring to these figures, the gripper bar assembly consists of nine fixed elements and eight spring biased elements as shown in FIG. 7*a*. Before activation, the spring biased elements such as 152, 154 and so on are in position such that a card can be forced between the teeth of the elements.

In the operation of the gripper bar assembly of FIG. 7*a*, initially a selected one of the gripper bars is actuated by the gripper bar actuator 166. This causes the gripper bar to be moved in the direction of arrow 156 of FIG. 7*b*. This displaces the movable elements 158 of the gripper bar one full tooth pitch with respect to its fixed element 160 again aligning the teeth in the two elements. When the desired card is raised partially out of the pack by the push-up bars of FIG. 1, a tab such as 162 moves between the teeth of the gripper bar assembly as shown in FIG. 7*a*. The card in the raised position is shown by the dotted line with the tab 162 in between the teeth of the movable and fixed gripper bar elements 158 and 160.

After the tab of the selected card is in place in the gripper bar assembly, the gripper bar actuator 166 releases the element 158. Thereupon the action of the spring 168 causes the teeth of the gripper bar elements 158 and 160 to grip the tab of the card.

After the desired card is grasped by the gripper bar assembly, the push-down bars of FIG. 1 push the seven remaining cards back into the pack and then the push-down bars retract. Thereupon, the entire gripper bar assembly as shown in FIG. 7*a* is moved to the right by the gripper bar actuator 166 of FIG. 7*b*, causing the card to move out of the pack in the direction of arrow 170 of FIG. 7*a*. After a predetermined amount of travel, the gripper bar assembly releases the card, then returns to its original position over the pack as shown in FIG. 7*a*.

An exploded view of a portion of the gripper bar assembly showing a number of mechanical details appears in FIG. 7c. The fixed and the spring biased gripper bar elements are all mounted on a shaft 172. The shaft fits through a circular opening such as 174 in the fixed elements and an oval-shaped opening such as 176 in the spring biased elements. Thus, the gripper bar actuator can cause the spring biased elements to move with respect to the shaft 172, in the direction of arrows 178. Movement of the entire gripper bar assembly for card extraction is achieved by moving the bar 172 in the direction of arrow 180. The gripper bar elements, both fixed and movable, move with the bar 172 being held in place by flanges (not shown) or the like on the bar adjacent to the two outer fixed gripper bar elements. The springs which may be fixed at their ends to a bracket mounted on the bar 172 also move with the bar 172.

To simplify the drawing, only four of the gripper bar elements are shown in FIG. 7c and only ten of the gripper bar elements are shown in FIG. 7b. FIG. 7a shows the entire seventeen gripper bar elements, that is, eight movable, spring-biased elements and nine fixed elements. It is also clear from FIG. 7a that the total width of a fixed and corresponding movable gripper bar element is roughly equal to the width of a tab.

A perspective schematic showing of a portion of the system of the invention appears in FIG. 4. One of the push-up bars is shown at 100. Only 4 cards are shown and two of these cards have tabs at the lower edge engaged by the push-up bar. When the push-up bar 100 is actuated by the electromagnet 102, the links 104 and 106 rotate about bars 109 and 113 causing the push-up bar to move in the upward direction. This causes the cards 111 and 112 partially to move out of the pack.

The gripper bar assembly of FIG. 7 is illustrated in FIG. 4 by the dashed line 114. The direction of movement of this assembly is illustrated by the arrows 116. The restrainer and push-down bars are illustrated schematically by the dashed line 118 and the direction of movement of these bars is illustrated by the arrows 120.

While one specific embodiment of the invention is illustrated, it should be appreciated that there are many alternatives which are possible. For example, rather than employing 4 restrainer bars which are coded in different ways to hold 120 of 128 cards in the pack, It is possible instead to employ an arrangement similar to that of the push-up bars. This requires 16 bars rather than 8, but in this arrangement, only one of the bars need be moved to abut the pack of cards, the remaining 15 bars being held above the pack and out of the way.

It has been found, in practice, that it is preferable to use, rather than a single tab at the bottom of the card, a plurality of such tabs. The purpose of the plurality of tabs is to provide more strength to the bottom edge of the card. This is advantageous as the card moves at very high speed along the raceway and the additional tabs in each card lessen the tendency for the card to buckle, since the cards adjacent to the selected cards help to support the selected cards. The coding at the bottom of the card involves not notching the card in the area next to one of the push-up bars as shown in FIG. 6. The illustration shows the bar 195 raised to engage card 180. Card 182 is coded to be engaged by bar 192.

In the embodiment of the invention illustrated, a gripper bar engages a tab in the card. In another card selection arrangement which operates on a principle which is somewhat different from the one used here, a bar is employed instead and it engages a notch in the card. A disadvantage of the latter arrangement is that the corners of the tabs are sometimes bent, damaging the card, due to the force exerted by the bar against the tab to propel the card out of the pack. The gripper bar has been found not to damage the card in this way. Yet, the gripper bar positively helds the card without danger of slippage.

What is claimed is:

1. In an arrangement for selecting one card from a pack of edge coded cards, said edge coding including graspable elements at a given edge of the respective cards; in combination:

grasping means adjacent to said given edge of the cards in said pack, said means comprising at least one elongated member having a length at least equal to the width of said pack and extending substantially parallel to the width dimension of said pack, and including a plurality of fixed and movable side-by-side teeth along the length of said member which face said given edge of the cards in said pack;

means for moving a group of cards, each card in said group having a graspable element in a different position along its given edge, partially out of said pack in a direction toward said grasping means; and means for causing said elongated member to grasp a card in said group of cards comprising means for moving its movable teeth toward its fixed teeth to thereby grasp the graspable element on said card between a fixed tooth and a movable tooth.

2. The arrangement set forth in claim 1, wherein said grasping means comprises a plurality of adjacent elongated members, each formed with fixed and movable side-by-side teeth along its length which face said given edge of the cards in said pack, and wherein the last-named means of the claim comprises means for actuating solely the one of said elongated members whose teeth are aligned with the graspable element on the particular card which it is desired to select from said group.

3. The arrangement set forth in claim 1, further including means for positioning said elongated member along the length of said given edge of the cards in said pack to a position such that its teeth are in line with a graspable element on the particular card in said group it is desired to select.

4. In an arrangement for selecting one card from a pack of edge coded cards, said edge coding including tabs on the respective cards, located at different positions along a given edge of said cards, in combination:

grasping means adjacent to said given edge of the cards in said pack, said means comprising at least one elongated member having a length at least equal to the width of said pack and extending substantially parallel to the width dimension of said pack, and including a plurality of fixed and movable side-by-side teeth along the length of said member which face said given edge of the cards in said pack;

means for moving a group of cards, each card in said group having a tab in a different position along its given edge, partially out of said pack in a direction toward said grasping means; and means for causing said elongated member to grasp a tab on a particular card in said group of cards comprising means for moving its movable teeth toward its fixed teeth to thereby grasp said tab on said particular card in said group between a fixed tooth and a movable tooth.

5. In an arrangement for selecting one card from a pack of edge coded cards, said edge coding including graspable elements on the respective cards, located at different positions along a given edge of said cards, in combination:

grasping means adjacent to said given edge of the cards in said pack, said means comprising at least one elongated member having a length at least equal to the width of said pack and extending substantially parallel to the width dimension of said pack, and including a plurality of fixed and movable side-by-side teeth along the length of said member which face said given edge of the cards in said pack;

means for moving a group of cards, each card in said group having a graspable element in a different position along its given edge, partially out of said pack in a direction toward said elongated member;

means for moving said elongated member toward the group of cards partially out of the pack a distance sufficient so that a graspable element of a particular card in said group is located between a fixed and a movable one of said teeth; and means for causing the movable teeth in said elongated member to move toward said fixed teeth to thereby grasp said graspable element on said particular card between a fixed tooth and a movable tooth.

6. The arrangement as set forth in claim 5, further including means for moving said elongated member along said given edge of cards in said pack to align the teeth thereon with the graspable element on a card it is desired to select.

7. The arrangement as set forth in claim 5, further including card return means extending in a direction parallel to said elongated member and having a length also at least equal to the width of said pack for abutting said given edge of the cards in said group not grasped by said elongated member for returning said cards to the pack.

8. In an arrangement as set forth in claim 5, further including drive means adjacent to said deck for propelling said card; and means for moving said elongated member after it has grasped a card in a direction parallel to said given edge of the cards in said deck for moving the selected card a distance sufficient so that it becomes engaged by the drive means, whereby said drive means propels said card the remaining distance out of said deck.

9. The arrangement as set forth in claim 5, further including restrainer means adjacent to said given edge of the cards in said pack for preventing the cards in said pack other than said group of cards from being moved in a direction toward said grasping means.

10. In the arrangement as set forth in claim 5, said graspable elements comprising tabs which are integral with the cards.

References Cited by the Examiner

UNITED STATES PATENTS

| | | | |
|---|---|---|---|
| 1,317,684 | 10/1919 | Brown et al. | 129—16.1 |
| 1,585,867 | 5/1926 | Kruse | 129—16.1 |
| 1,709,430 | 4/1929 | Hentzschel | 129—16.1 |
| 1,744,373 | 1/1930 | Erich | 129—16.1 |
| 3,092,114 | 6/1963 | Jonker | 129—16.1 |
| 3,105,593 | 10/1963 | Fredkin | 129—16.1 |
| 3,176,279 | 3/1965 | Lin et al. | 129—16.1 |
| 3,176,841 | 4/1965 | Staats | 129—16.1 |

FOREIGN PATENTS 508,589 7/1939 Great Britain.

References Cited by the Applicant

UNITED STATES PATENTS 2,359,705 10/1944 Zalkind.

FOREIGN PATENTS

| | | |
|---|---|---|
| 229,167 | 10/1941 | Canada. |
| 480,522 | 1/1952 | Canada. |
| 629,845 | 4/1936 | Germany. |
| 78,758 | 5/1929 | Sweden. |

JEROME SCHNALL, *Primary Examiner.*